Feb. 14, 1956 W. F. WERTH ET AL 2,735,012

DISABLING CIRCUIT

Filed April 27, 1951

INVENTORS.
WILLARD F. WERTH
BY ROBERT C. MIEDKE

Marvin Moody

ATTORNEY

United States Patent Office 2,735,012
Patented Feb. 14, 1956

2,735,012

DISABLING CIRCUIT

Willard F. Werth and Robert C. Miedke, Cedar Rapids, Iowa, assignors to Collins Radio Company, Cedar Rapids, Iowa, a corporation of Iowa Application April 27, 1951, Serial No. 223,272

2 Claims. (Cl. 250—36)

Figure 1:
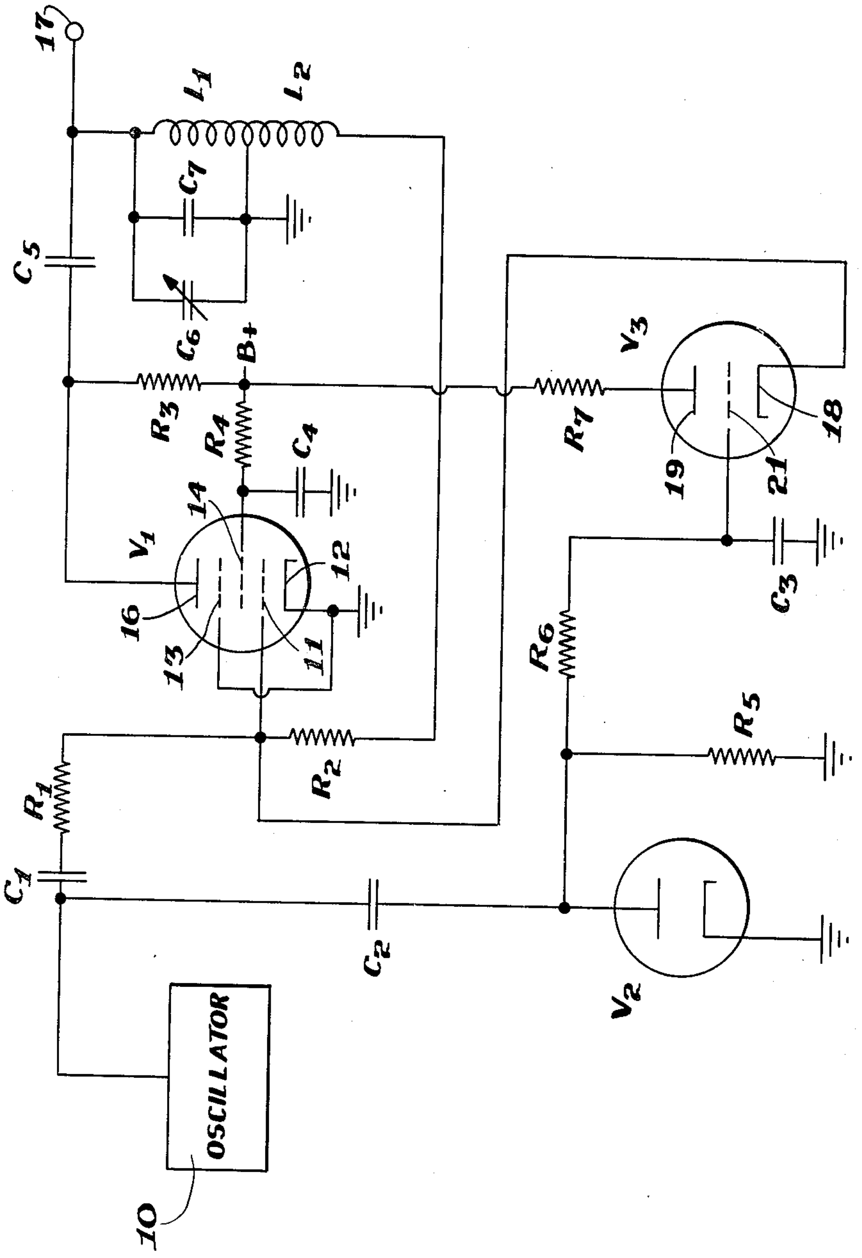

This invention relates in general to disabling circuits and in particular to means for preventing an oscillator from oscillating at a random frequency upon failure of the driving signal.

Oftentimes it is desirable to divide the frequency of a master oscillator to a lower frequency. One method of doing this is to use the circuit described in the patent to L. A. Schuttig No. 2,248,481, issued July 4, 1941, entitled, Oscillating System. This circuit is further described in the patent to E. Norrman No. 2,479,180, August 16, 1949, entitled Frequency Divider.

In this type of divider, if the input signal disappears the divider will continue to oscillate at an independent frequency and there will be no indication in the output that the input signal has been removed.

It is an object of this invention, therefore, to provide means for disabling a frequency divider when the input signal disappears.

Another object of this invention is to provide electronic control for a frequency divider to prevent it from oscillating at an independent frequency.

A feature of this invention is found in the provision for a first tube receiving a portion of the input signal being fed to a divider, a second tube with its bias controlled by the first tube, and the second tube controlling the bias on the frequency divider to prevent it from oscillating when no control signal is received.

Further features, objects and advantages will become apparent from the following description and claims when read in view of the drawings, in which Figure 1 illustrates the disabling circuit of this invention.

With reference to the drawing, an oscillator 10 produces an output which it is desired to divide to a lower frequency. A frequency divider comprising a tube $V_1$ which might be, for example, a type 6AU6, receives the output of oscillator 10 on its control grid 11 through the resistor $R_1$ and the coupling condenser $C_1$. The cathode 12 of tube $V_1$ is connected to ground and the suppressor grid 13 is connected to the cathode.

A screen grid 14 is connected to a condenser $C_4$ which has its opposite side connected to ground. A resistor $R_4$ is connected between grid 14 and B+. The plate 16 of tube $V_1$ is connected to a blocking condenser $C_5$ and a resistor $R_3$ which has its opposite side connected to B+.

The opposite side of $C_5$ is conneceted to an output terminal 17. A parallel resonant circuit comprising the inductor $L_1$ and the capacitors $C_6$ and $C_7$ are connected to output terminal 17 and have their opposite sides connected to ground.

A second inductance is inductively coupled to $L_1$ and is connected from ground to a resistor $R_2$ which has its opposite side connected to the control grid 11 of tube $V_1$. The values of $L_1$, $C_6$ and $C_7$ determine the output frequency appearing at the output terminal 17.

The tube with the related circuitry just described comprises a frequency divider and for an explanation of its theory of operation reference may be made to Patent No. 2,479,180 previously referenced.

A second electron tube $V_2$ is a diode rectifier such as type 6AL5 and has its cathode connected to ground and its plate connected to one side of a coupling condenser $C_2$. The opposite side of coupling condenser $C_2$ is connected to the output of the oscillator 10. A resistor $R_5$ is connected between ground and the plate of tube $V_2$.

A third tube $V_3$ has its cathode 18 connected to the control grid 11 of tube $V_1$. The plate 19 of tube $V_3$ is connected to a resistor $R_7$ which has its opposite side connected to B+. The control grid 21 of tube $V_3$ is connected to a resistor $R_6$ which has its opposite side connected to the plate of tube $V_2$. A filter condenser $C_3$ is connected between ground and the grid 21.

Examples of component values where the oscillator 10 produces an output of 200 kilocycles and the output of the divider is at 20 kilocycles are:

$C_1$=100 micromicrofarads
$C_2$=51 micromicrofarads
$C_3$=470 micromicrofarads
$C_4$=0.01 microfarads
$C_5$=0.01 microfarads
$C_6$=variable from 8 to 50 micromicrofarads
$C_7$=160 micromicrofarads
$L_1$=164 millihenries
$L_2$=11.3 millihenries
Mutual inductance between $L_1$ and $L_2$=43 millihenries
$R_1$=680,000 ohms
$R_1$=47,000 ohms
$R_3$=100,000 ohms
$R_4$=100,000 ohms
$R_5$=470,000 ohms
$R_6$=820,000 ohms
B+ may be 250 volts positive direct current In operation, when oscillator 10 is producing an output, tube $V_2$ acts as a half wave rectifier and a negative voltage will be developed across the resistor $R_5$. The negative voltage developed across the resistor $R_5$ controls the flow of current in tube $V_3$ and it is biased to cut-off. Tube $V_3$ controls the bias of tube $V_1$ and when tube $V_3$ is not conducting, tube $V_1$ is oscillating in a normal manner. The output of the divider appearing at terminal 17 will be the desired sub-harmonic of the input oscillator's output.

Assume that the oscillator 10 fails and that it gives no output. When this occurs no voltage is applied to the diode $V_2$ and no voltage will be developed across the resistor $R_5$. This removes the bias from the tube $V_3$ so that it conducts and thus allows a portion of B+ to be applied to the control grid of $V_1$. This causes $V_1$ to stop oscillating. There will be no alternating current output at the terminal 17.

It is seen that this invention provides means for preventing a divider circuit from continuing to give an output when no input is received. Thus, notice is given to the operator that there has been a failure of the input to the divider. Without the disabling circuit of this invention, the operator would not be given notice of the loss of an input because the divider would continue to oscillate at some frequency other than that at which it operates with an input.

Although the invention has been described with respect to a preferred embodiment thereof, it is not to be so limited as changes and modifications may be made therein which are within the full intended scope of the invention as defined by the appended claims.

We claim:

1. In a frequency divider of the harmonic oscillator type, an input oscillator provided with an output terminal, a divider tube having a control grid, a grid resistor connected between said output terminal and ground, one terminal of said resistor being connected to said control grid, a disabling tube having a plate electrode connected to a plate supply voltage and a cathode connected through said grid resistor to ground for applying a portion of said plate supply voltage across said grid resistor when said disabling tube is conductive, and means for rendering said disabling tube conductive when the output of said input oscillator fails.

2. A disabling circuit for preventing oscillations in a frequency divider of the harmonic oscillation type including an input oscillator having an output terminal, a divider tube having a control electrode, a first resistor connected between said terminal and said control electrode, a second resistor connected between said control electrode and ground, a disabling tube having a plate electrode connected to a plate supply voltage terminal and a cathode connected to said control electrode of said divider tube, means including a control grid for rendering said disabling tube conductive for developing a positive disabling voltage on said control electrode across said second resistor, a rectifier and a shunt resistance connected between said output terminal and ground for developing a control voltage across said shunt resistor, a connection to said shunt resistor for impressing said control voltage on said control grid for rendering said disabling tube nonconductive when said input oscillator is operative and conductive when said input oscillator fails.

References Cited in the file of this patent

UNITED STATES PATENTS

| | | |
|---|---|---|
| 2,261,643 | Brown | Nov. 4, 1941 |
| 2,479,548 | Young | Aug. 16, 1949 |
| 2,536,646 | King | Jan. 2, 1951 |
| 2,617,036 | Hansen | Nov. 4, 1952 |

OTHER REFERENCES

"Combined Output Control and Screen Protective Circuit" from QST, February 1950, page 33.